United States Patent
Chang et al.

(10) Patent No.: US 8,265,898 B2
(45) Date of Patent: Sep. 11, 2012

(54) SYSTEM AND METHOD FOR VERIFYING A PROBE TIP

(75) Inventors: Chih-Kuang Chang, Taipei Hsien (TW); Xin-Yuan Wu, Shenzhen (CN); Min Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 251 days.

(21) Appl. No.: 12/862,779

(22) Filed: Aug. 25, 2010

(65) Prior Publication Data

US 2011/0161046 A1    Jun. 30, 2011

(30) Foreign Application Priority Data

Dec. 30, 2009   (CN) .......................... 2009 1 0312704

(51) Int. Cl.
*G01B 5/008* (2006.01)

(52) U.S. Cl. ..................................................... 702/152

(58) Field of Classification Search ................... 702/152
See application file for complete search history.

(56) References Cited

OTHER PUBLICATIONS

Tibet Erkan & René Mayer & Adam Woźniak, Surface probing simulator for the evaluation of CMM probe radius correction software, Dec. 4, 2010, 9 pages.*

\* cited by examiner

*Primary Examiner* — Tung S Lau
(74) *Attorney, Agent, or Firm* — Altis Law Group, Inc.

(57) ABSTRACT

A computing system and method verifies a probe tip of a coordinate measuring machine. The computing system simulates a virtual sphere and calculates coordinates of the center of the virtual sphere. The coordinates of first real contact points of the real sphere is obtained to calculate coordinates of the center of the real sphere and coordinates of the ideal contact points of the real sphere. The computing system obtains coordinates of second real contact points of the real sphere is obtained according to the coordinates of the ideal contact points of the real sphere. The radius of the probe tip is calculated according to the coordinates of second real contact points of the real sphere. The computing system determines if the calculated radius of the probe tip falls in an allowable range.

15 Claims, 8 Drawing Sheets

SYSTEM AND METHOD FOR VERIFYING A PROBE TIP

BACKGROUND

1. Technical Field

Embodiments of the present disclosure relate to probes, and more particularly to a system and method for verifying a probe tip.

2. Description of Related Art

A coordinate measuring machine (CMM) is a device that is used for measuring physical geometrical characteristics of an object. Generally, the CMM includes a probe tip used to contact the object, so as to collect coordinates of the surface of the object. However, if the probe tip is not qualified, the measurement result will be not correct.

DETAILED DESCRIPTION

All of the processes described below may be embodied in, and fully automated via, function modules executed by one or more general purpose computers or processors. The code modules may be stored in any type of computer-readable medium or other computer storage device. Some or all of the methods may alternatively be embodied in specialized computer hardware.

Figure 1:
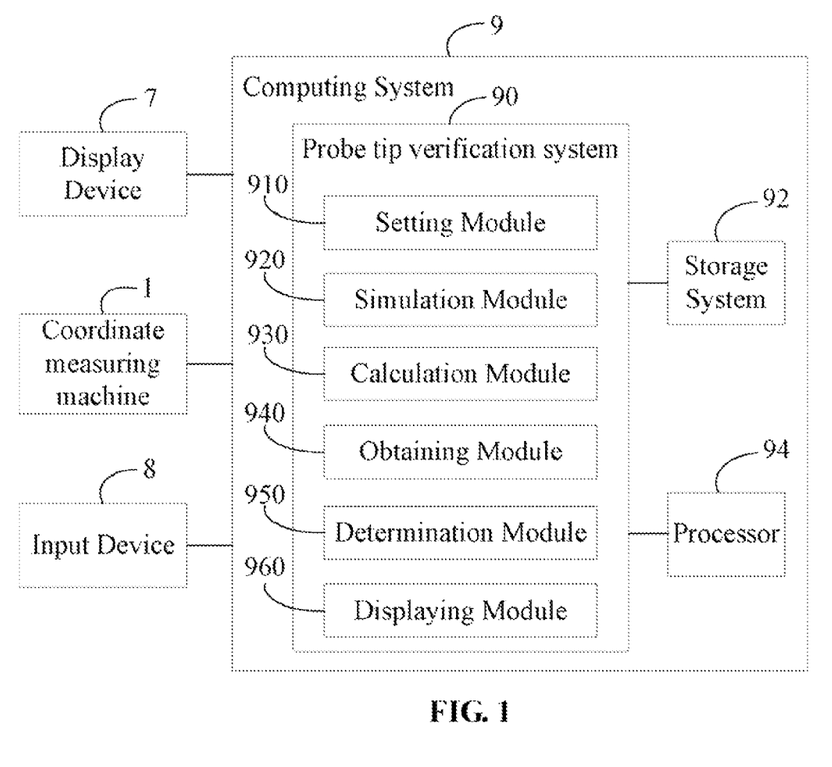
FIG. 1 is a block diagram of one embodiment of a computing system comprising a probe tip verification system.

FIG. 1 is a block diagram of one embodiment of a computing system 9 comprising a probe tip verification system 90. In one embodiment, the probe tip verification system 90 may be used to verify a tip 50 of a probe 5 (hereinafter, probe tip 50). The computing system 9 is connected to a coordinate measuring machine 1, a display device 7, and an input device 8. Depending on the embodiment, the computing system 9 may be a personal computer (PC), a network server, or any other appropriate data-processing equipment.

Figure 2:
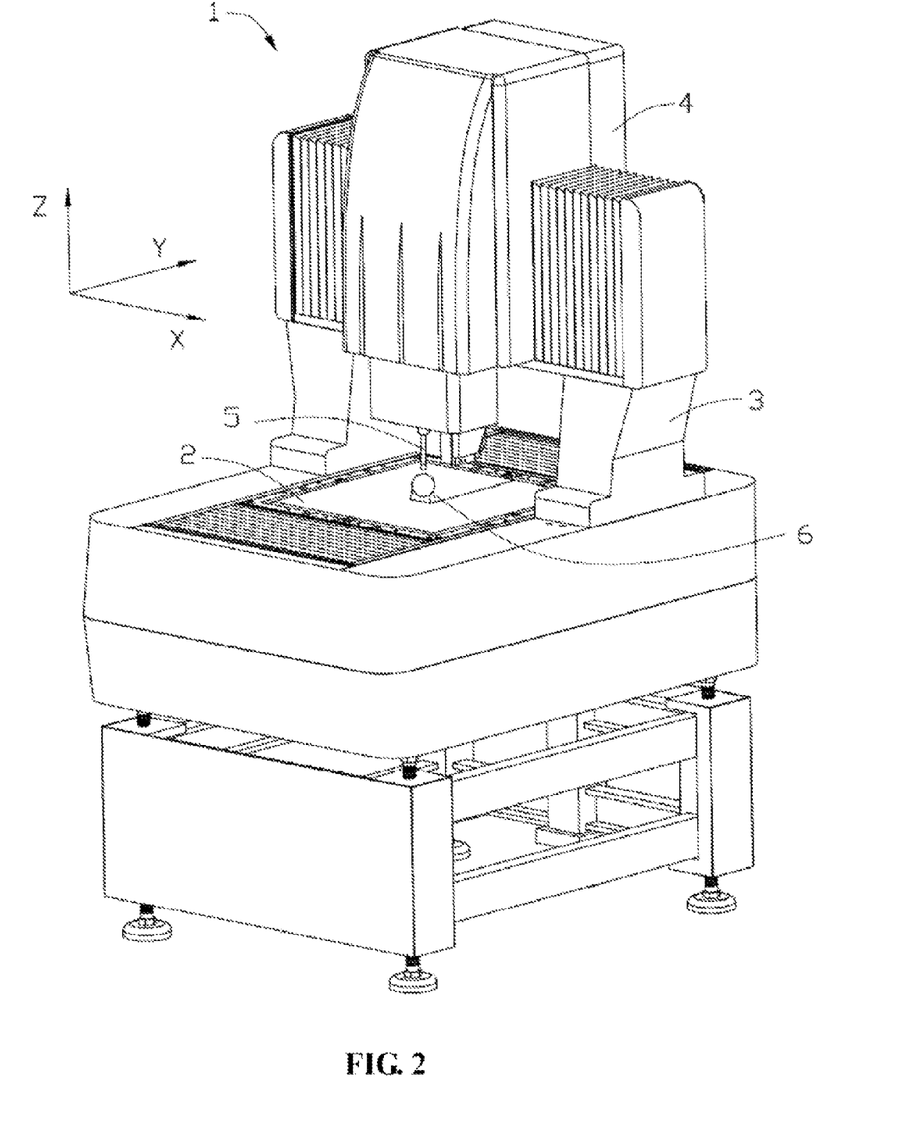
FIG. 2 is an isometric view of one embodiment of a coordinate measuring machine.
Figure 3:
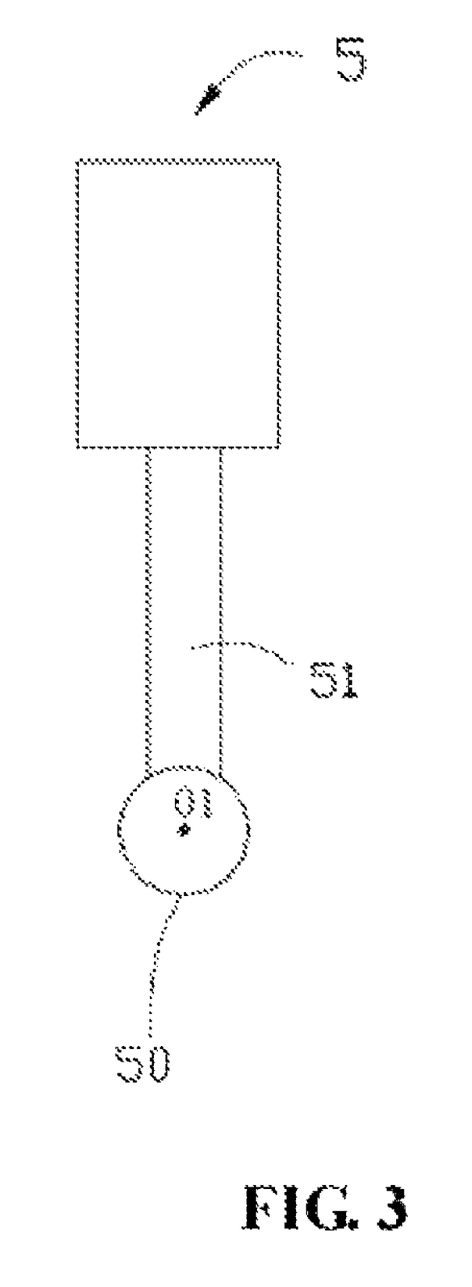
FIG. 3 is an isometric view of one embodiment of a probe of FIG. 2.
Figure 5:
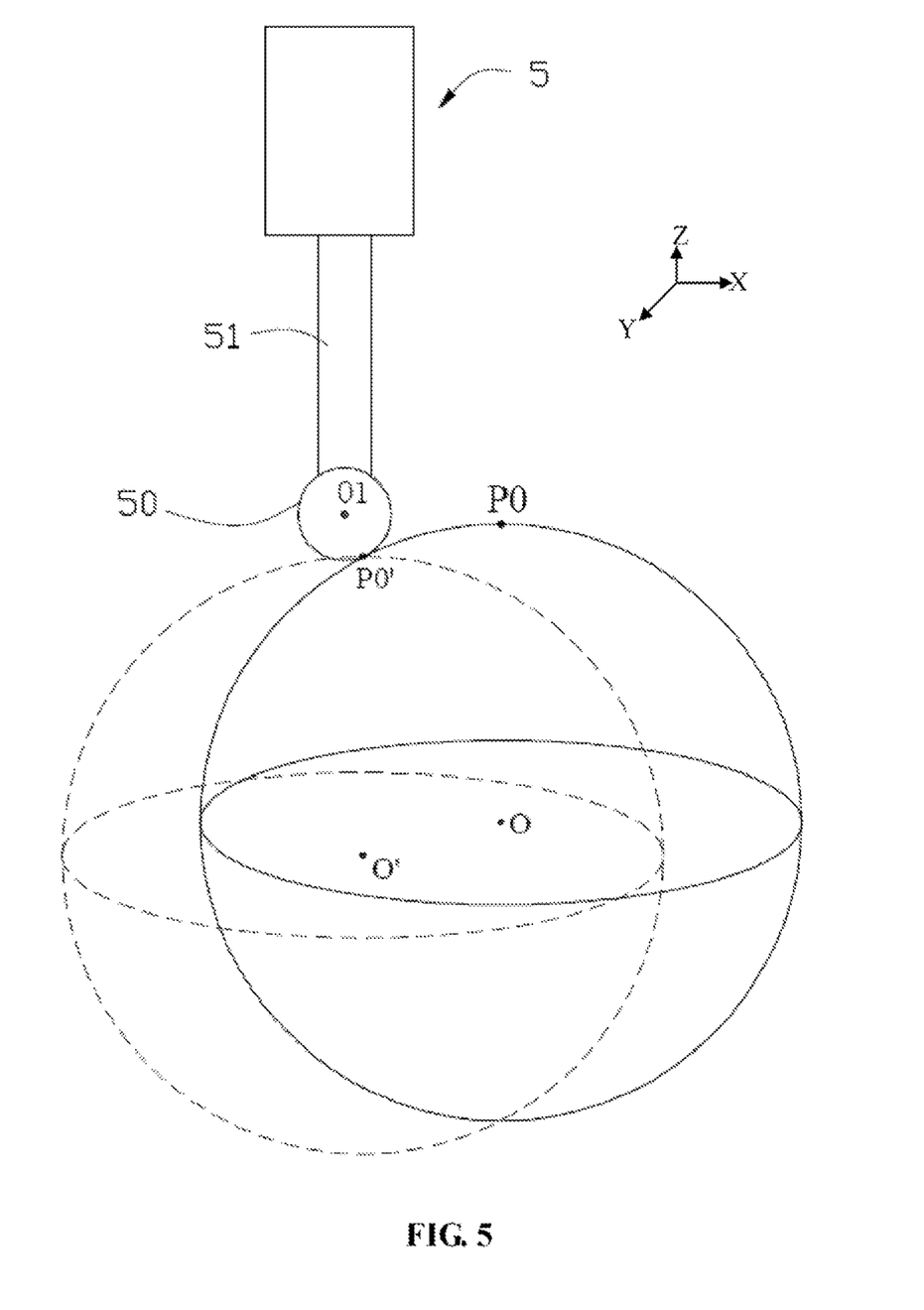
FIG. 5 illustrates one embodiment of simulating the virtual sphere.

In one embodiment, as shown in FIG. 2, the coordinate measuring machine 1 comprises a horizontal worktable 2, a bracket 3, a top cover 4, the probe 5, and a real sphere 6. The bracket 3 is mounted to the worktable 2. The top cover 4 is mounted to a middle part of the bracket 3. The probe 5 is coupled to the top cover 4. In order to measure coordinates and dimensions of the real sphere 6, the real sphere 6 is positioned on the worktable 2. The probe 5 is movable along an X-axis, a Y-axis, and a Z-axis of the coordinate measuring machine 1. As shown in FIG. 3, the probe 5 includes a probe tip 50 and a shaft 51. The probe tip 50 is located at a distal end of the shaft 51. The probe 5 collects coordinates of real contact points when the probe tip 50 contacts surface of the real sphere 6. For example, as shown in FIG. 5, the probe 5 automatically collects the coordinates of a real contact point P0' when the probe tip 50 contacts the surface of the real sphere 6. Additionally, the real contact points include first real contact points and the second real contact points. Further details of the first real contact points and the second real contact points will be described below.

The input device 8 is used to input parameters to the coordinate measuring machine 1. The parameters are used for verifying the probe tip 50. It should be understood that the term "verifying" may be defined as a process to test if the probe tip 50 is qualified according to the parameters. Further details of parameters are described below. In one embodiment, the input device 8 may be, but are not limited to, a mouse, a keyboard, or a virtual keyboard, for example. The display device 7 displays parameters of the probe tip 50. Additionally, the display device 7 displays verification results of the probe tip 50. For example, if the probe tip verification system 90 determines that the probe tip 50 is qualified, the display device 7 displays "SUCCESS," and if the probe tip verification system 90 determines that the probe tip 50 is unqualified, the display device 7 displays "FAIL." A user can then determine if the probe tip 50 is qualified by viewing the verification results displayed on the display device 7.

In one embodiment, the probe tip verification system 90 includes a setting module 910, a simulation module 920, a calculation module 930, an obtaining module 940, a determination module 950, and a displaying module 960. One or more computerized codes of the modules 910-960 are stored in the storage system 92. One or more general purpose or specialized processors, such as a processor 94 executes the computerized codes of the modules 910-960 to provide one or more operations of the probe verification system 90.

The setting module 910 sets the parameters that are used for verifying the probe tip 50. The parameters include the radius of the real sphere 6, a number of ideal contact points between the probe tip 50 and a virtual sphere or the real sphere 6, and an allowable range for a radius of the probe tip 50. It should be understood that the greater the number of ideal contact points that a user sets, the verification results will have a higher accuracy. Furthermore, four points determine a sphere in mathematics. The number of the ideal contact points requires at least four ideal contact points, which are non coplanar.

Figure 4:
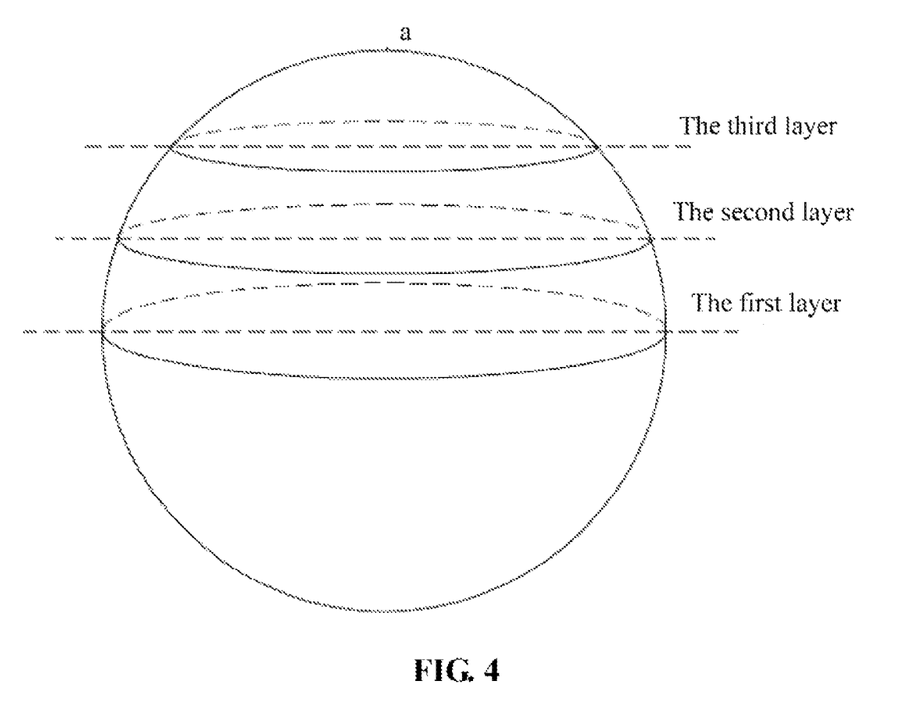
FIG. 4 illustrates one embodiment of distributing ideal contact points on a virtual sphere or a real sphere.

The ideal contact points are distributed on the surface of the virtual sphere or the real sphere 6. Definition of the virtual sphere is referred to the description of the simulation module 920. Further details of how to distribute ideal contact points are described with respect to FIG. 4. As shown in FIG. 4, the upper hemisphere of the real sphere 6 is divided into three layers, such as the first layer, the second layer, and the third layer. Distances between each two neighboring layers are the same. For example, a distance between the first layer and the second layer is equal to a distance between the second layer and the third layer, and also equal to a distance between the third layer and a top point "a" positioned on the real sphere 6. In one embodiment, an ideal contact point is required to be distributed on the top point "a" of the real sphere 6. Each layer has a maximum capacity for the ideal contact points. The ideal contact points are distributed on each layer in order. The ideal contract points will be distributed on the first layer first, if the ideal contact points on the first layer reach the maximum capacity of the first layer, then the left ideal contact points will are distributed on the second layer. The allowable range is a predetermined range.

The simulation module 920 simulates the virtual sphere according to the radius of the real sphere 6 and a random point on the upper hemisphere surface of the real sphere 6, and calculates coordinates of a center of the virtual sphere. The random point P0' is near to the top point P0 of the real sphere 6. As shown in FIG. 5, the size of the virtual sphere is the same as the real sphere 6, the random point P0' is the top point of the virtual sphere. For example, if the radius of the real sphere 6 is r, the coordinates of P0' is (X0', Y0', Z0'), then the coordinates of the center of the virtual sphere is (X0', Y0', Z0'−r).

The calculation module 930 calculates coordinates of the ideal contact points of the virtual sphere according to the coordinates of the center of the virtual sphere and the number of the ideal contact points. For example, if the coordinates of the center of the virtual sphere are (X0', Y0', Z0'−r), then the coordinate of Z-axis of the first layer is Z0'−r, the coordinate of Z-axis of the second layer is Z0'−2r/3, and the coordinate of Z-axis of the third layer is Z0'−r/3. One embodiment of a formula for computing coordinates of each ideal contact point of the virtual sphere is described as follows:

$$Xi' = X0' + \cos(i*a)*r;\ Yi' = Y0' + \sin(i*a)*r;$$
$$Z = \text{coordinates of Z-axis of the layer};$$

where, a = 360/N, i<=N, and N is equal to the number of the ideal contact points distributed on each layer, (X0', Y0') are the X-axis and Y-axis coordinates of the center of the virtual sphere.

Figure 6:
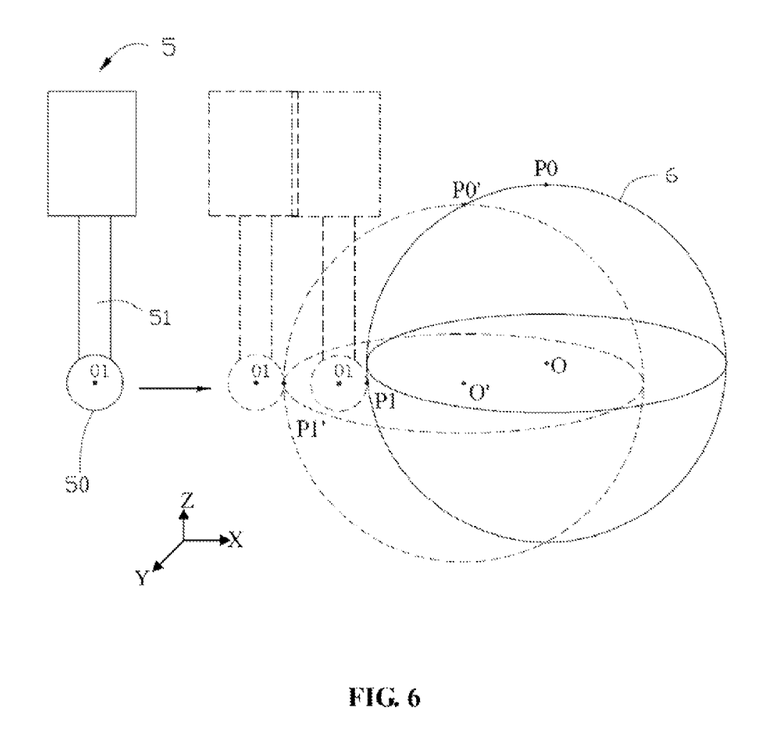
FIG. 6 illustrates one embodiment of a process for obtaining coordinates of a first real contact point on the real sphere.

The obtaining module 940 obtains coordinates of first real contact points of the real sphere 6 according to the coordinates of the ideal contact points of the virtual sphere. It should be understood that the term "first real contact points" may be defined as points that the probe tip 50 contacts the surface of the real sphere 6 when the probe tip 50 is to horizontally move across the ideal contact points of the virtual sphere. In one embodiment, if the number of the ideal contact points is 20, the obtaining module 940 obtains 20 first real contact points of the real sphere 6. Taking a first real contact point for example, as shown in FIG. 6, the probe tip 50 is to touch the ideal contact point P1' of the virtual sphere, the probe tip 50 moves along X-axis direction and across the ideal contact point P1' and contacts the first contact point P1 at last. The obtaining module 940 obtains the coordinates of the first contact point P1 when the probe tip 50 contacts the point P1 according to the ideal contact point P1' of the virtual sphere.

The calculation module 930 further calculates coordinates of the center of the real sphere 6 according to the coordinates of the first real contact points. In one embodiment, the center of the real sphere 6 is calculated by a fitting algorithm and a quasi-Newton iterative algorithm based on the coordinates of the first real contact points.

The calculation module 930 further calculates coordinates of the ideal contact points of the real sphere 6 according to the coordinates of the center of the real sphere 6. For example, if the coordinates of the center of the real sphere 6 are (X0, Y0, Z0), the coordinate of Z-axis of the first layer is Z0, the coordinate of Z-axis of the second layer is Z0+r/3, the coordinate of Z-axis of the third layer is Z0+2r/3. One embodiment of a formula for computing coordinates of each ideal contact point of the real sphere 6 is described as follows:

$$Xi = X0 + \cos(i*a)*r;\ Yi = Y0 + \sin(i*a)*r;\ Z = \text{coordinates of Z-axis of the layer};$$

where, a = 360/N, i<=N, and N is equal to the number of the ideal contact points on each layer.

Figure 7:
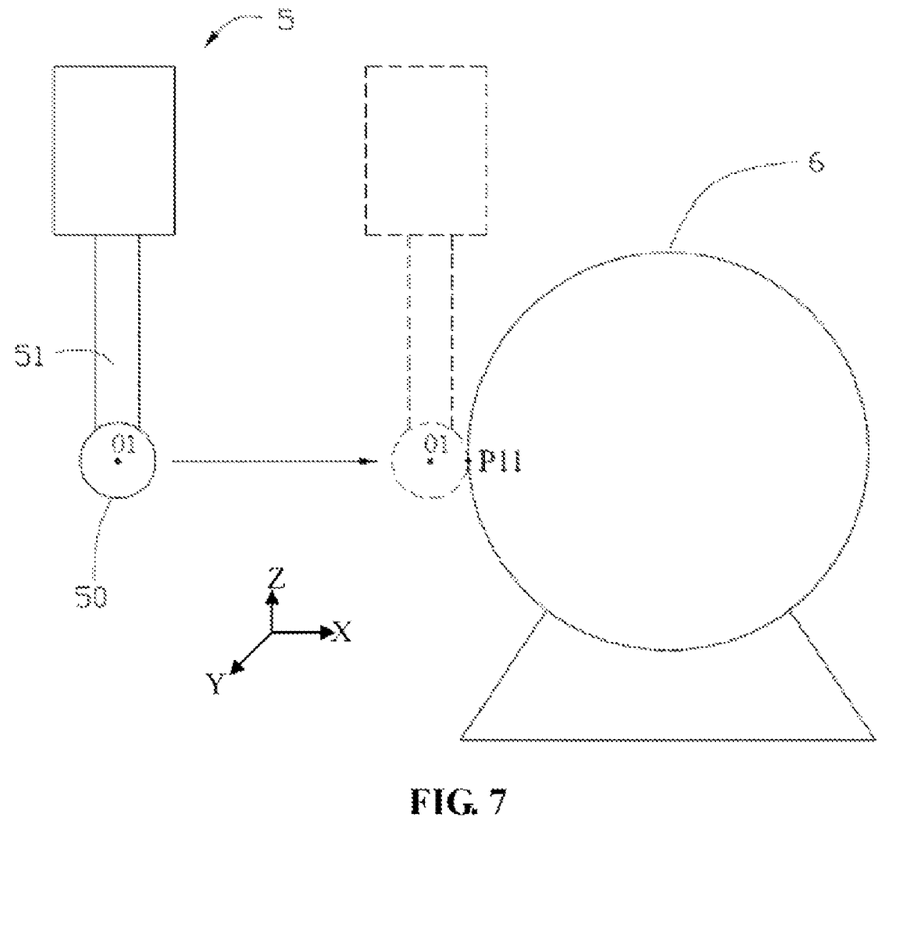
FIG. 7 illustrates one embodiment of a process for obtaining coordinates of a second real contact point on the real sphere.

The obtaining module 940 further obtains coordinates of second real contact points of the real sphere 6 according to the coordinates of the ideal contract points of the real sphere 6. It should be understood that the term "second real contact points" may be defined as points that the probe tip 50 contacts the surface of the real sphere 6 when the probe tip 50 is to horizontally move across the ideal contact points of the real sphere 6. As shown in FIG. 7, the probe tip 50 is to touch an ideal contact point of the real sphere 6, the probe tip 50 moves alone X-axis direction and contact the second real contact point P11 of the real sphere 6 at last. The obtaining module 940 obtains the coordinates of the second real contact point P11 when the probe tip 50 contacts the point P11.

The calculation module 930 further calculates the radius of the probe tip 50 according to the coordinates of the second real contact point. In one embodiment, the radius of the probe tip 50 is calculated by the fitting algorithm and the quasi-Newton iterative algorithm based on the coordinates of the first real contact points.

The determination module 950 determines if the calculated radius of the probe tip 50 falls in the allowable range.

The displaying module 960 displays verification success or verification failure information on the display device 7. In one embodiment, the displaying module 960 displays the verification success information on the display device 7, in response to a determination that the calculated radius of the probe tip 50 falls in the allowable range. For example, if the calculated radius of the probe tip 50 is 0.13 millimeters (mm), then the displaying module 960 displays "SUCCESS" on the display device 7. The displaying module 960 displays also the verification failure information on the display device 7, in response to a determination that the calculated radius of the probe tip 50 does not fall in the allowable range. For example, if the calculated radius of the probe tip 50 is 0.11 mm, then the displaying module 114 displays "FAIL" on the display device.

Figure 8:
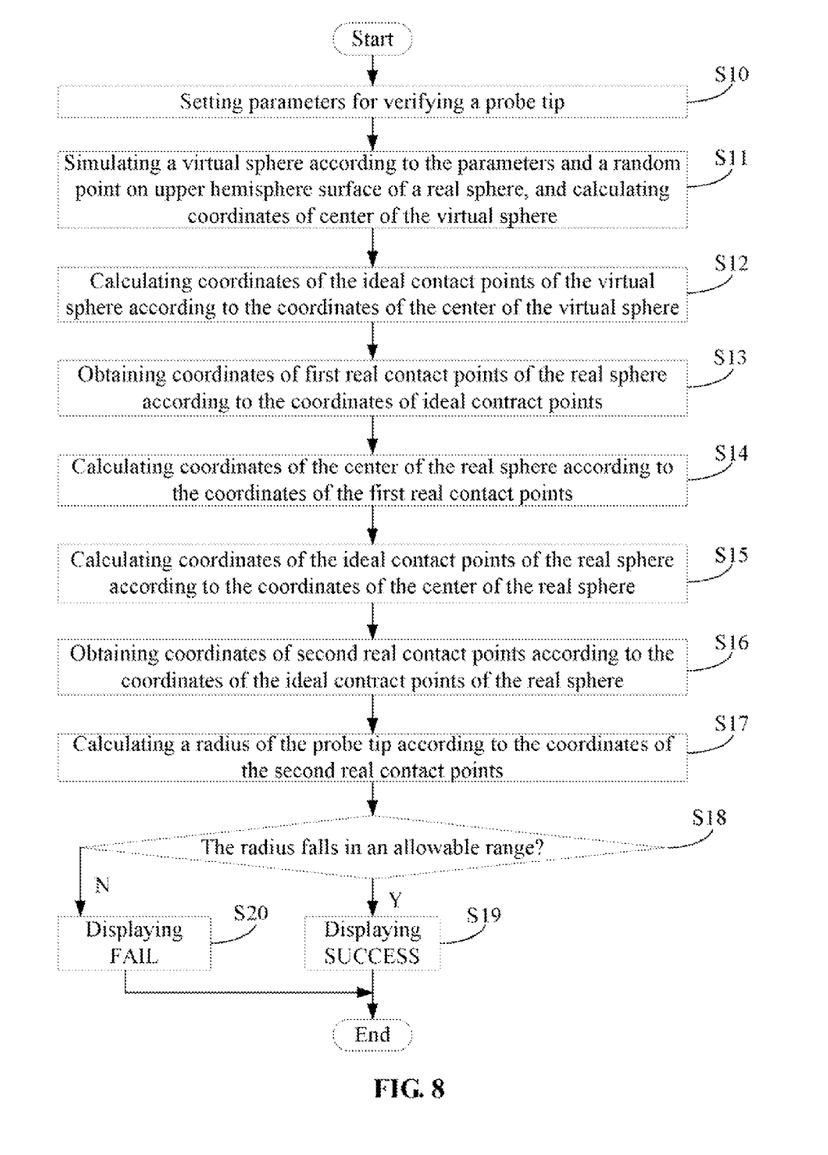
FIG. 8 is a flowchart of one embodiment of a method for verifying the probe tip using the probe tip verification system of FIG. 1.

FIG. 8 is a flowchart of one embodiment of a method for verifying the probe tip 50. Depending on the embodiment, additional blocks may be added, while others deleted, and the blocks may also be executed in a different order than described.

In block S10, the setting module 910 sets parameters that are used for verifying the probe tip 50. The parameters include the radius of the real sphere 6, a number of ideal contact points between the probe tip 50 and a virtual sphere or the real sphere 6, and an allowable range for a radius of the probe tip 50. The ideal contact points are distributed on the surface of the virtual sphere or the real sphere 6. Further details of how to distribute ideal contact points are described with respect to FIG. 4. As shown in FIG. 4, the ideal contact points are distributed on upper hemisphere surface of the real sphere 6. The upper hemisphere of the real sphere 6 is divided into three layers, such as the first layer, the second layer, and the third layer, for example. Distances between each two neighboring layers are the same. For example, a distance between the first layer and the second layer is equal to a distance between the second layer and the third layer, and also equal to a distance between the third layer and a top point "a" of the real sphere 6. In one embodiment, an ideal contact point is required to be distributed on the top point "a" of the real sphere 6. Each layer has a maximum capacity for the ideal contact points. The ideal contact points are distributed on each layer in order. The ideal contract points are distributed on the first layer first, if the ideal contact points on the first layer reach the maximum capacity of the first layer, then the left ideal contact points are distributed on the second layer. For example, the top point of the real sphere 6 is required to distribute with an ideal contact point, the first layer distributes with from 3 to 10 ideal contact points. The second layer distributes with from 0 to 6 ideal contact points. The third layer distributes with from 0 to 3 ideal contact points. For example, if the real sphere 6 distributes with 20 ideal contact points, the distribution of the 20 ideal contact points on the surface of the real sphere 6 is followed: the top point "a" distributes with 1 ideal contact point, the first layer distributes with 10 ideal contact points, the second layer distributes with 6 ideal contact points, the third layer distributes with 3 ideal contact points. The allowable range is a predetermined range. For example, allowable range is [+0.12 millimeters (mm), +0.14 mm]. It is understood that, in this embodiment, allowable values between the minimum boundary value and the maximum boundary value are regarded as allowable errors.

In block S11, the simulation module 920 simulates the virtual sphere according to the radius of the real sphere 6 and a random point on the upper hemisphere surface of the real sphere 6, and calculates coordinates of a center of the virtual sphere. The random point P0' is near to the top point P0 of the real sphere 6. For example, as shown in FIG. 5, if the radius of the real sphere 6 is r, and the coordinates of P0' is (X0', Y0', Z0'), then the coordinates of the center of the virtual sphere is (X0', Y0', Z0'−r).

In block S12, the calculation module 930 calculates coordinates of the ideal contact points of the virtual sphere according to the coordinates of the center of the virtual sphere and the number of the ideal contact points. For example, if coordinates of the center of the virtual sphere are (X0', Y0', Z0'−r), the coordinate of Z-axis of the first layer is Z0'−r, the coordinate of Z-axis of the second layer is Z0'−2r/3, and the coordinate of Z-axis of the third layer is Z0'−r/3. For example, if the number of the ideal contact points is 20, the coordinates of each ideal contact point of the virtual sphere in the first layer is described as follows:

$$Xi'=X0'+\cos(i*36)*r; Yi'=Y0'+\sin(i*36)*r; Z'=Z0'-r,$$
where $i=1, 2, \ldots, 10$.

The coordinates of each ideal contact point of the virtual sphere in the second layer is described as follows:

$$Xi'=X0'+\cos(i*60)*r; Yi'=Y0'+\sin(i*60)*r; Z'=Z0'-2r/3, \text{ where } i=1, 2, \ldots, 6.$$

The coordinates of each ideal contact point of the virtual sphere in the third layer is described as follows:

$$Xi'=X0'+\cos(i*120)*r; Yi'=Y0'+\sin(i*120)*r; Z'=Z0'-r/3, \text{ where } i=1, 2, 3.$$

In block S13, the obtaining module 940 obtains coordinates of first real contact points of the real sphere 6 according to the coordinates of the ideal contact points of the virtual sphere. For example, as shown in FIG. 6, the probe tip 50 is to touch the ideal contact point P1' of the virtual sphere, the probe tip 50 moves along X-axis direction and across the ideal contact point P1' and contacts the first contact point P1 at last. The obtaining module 940 obtains the coordinates of the first contact point P1 when the probe tip 50 contacts the surface of the real sphere 6 according to the ideal contact point P1' of the virtual sphere.

In block S14, the calculation module 930 calculates coordinates of the center of the real sphere 6 according to the coordinates of the first real contact points. As mentioned above, the center of the real sphere 6 is calculated by a fitting algorithm and a quasi-Newton iterative algorithm based on the coordinates of the first real contact points.

In block S15, calculation module 930 further calculates coordinates of the ideal contact points of the real sphere 6 according to the coordinates of the center of the real sphere 6. For example, if coordinates of the center of the real sphere 6 are (X0, Y0, Z0), the coordinate of Z-axis of the first layer is Z0, the coordinate of Z-axis of the second layer is Z0+r/3, the coordinate of Z-axis of the third layer is Z0+2r/3. For example, if the number of the ideal contact points is 20, the coordinates of each ideal contact point of the real sphere 6 in the first layer is described as follows:

$$Xi=X0+\cos(i*36)*r; Yi=Y0+\sin(i*36)*r; Z=Z0.$$

The coordinates of each ideal contact point of the real sphere 6 in the second layer is described as follows:

$$Xi=X0+\cos(i*60)*r; Yi=Y0+\sin(i*60)*r; Z=Z0+r/3.$$

The coordinates of each ideal contact point of the real sphere 6 in the second layer is described as follows:

$$Xi=X0+\cos(i*120)*r; Yi=Y0+\sin(i*120)*r; Z=Z0+2r/3.$$

In block S16, the obtaining module 940 further obtains coordinates of second real contact points of the real sphere 6 according to the coordinates of the ideal contract points of the real sphere. As shown in FIG. 7, the probe tip 50 is to touch an ideal contact point of the real sphere 6, the probe tip 50 moves alone X-axis direction and contact the second real contact point P11 of the real sphere 6 at last. The obtaining module 940 obtains the coordinates of the second real contact point P11

In block S17, the calculation module 930 further calculates the radius of the probe tip 50 according to the coordinates of the second real contact point. In one embodiment, the radius of the probe tip 50 is calculated by the fitting algorithm and the quasi-Newton iterative algorithm based on the coordinates of the first real contact points.

In block S18, the determination module 950 determines if the calculated radius of the probe tip 50 falls in the allowable range. As mentioned above, allowable range is [+0.12 millimeters (mm), +0.14 mm]. In one embodiment, if the calculated radius of the probe tip is 0.13 mm, then the procedure goes to S19. Otherwise, if the calculated radius of the probe tip is 0.11 mm, then the procedure goes to S20.

In block S19, the displaying module 960 displays verification success information on the display device 7. As mentioned above, the displaying module 960 displays "SUCCESS" on the display device 7.

In block S20, the displaying module 960 displays verification failure information on the display device 7. As mentioned above, the displaying module 960 displays "FAIL" on the display device 7.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system, comprising:
   a storage system;
   at least one processor; and
   a probe tip verification system stored in the storage system and being executable by the at least one processor, the probe tip verification system comprising:
   a setting module operable to set parameters that are used for verifying a probe tip of a coordinate measuring machine, wherein the parameters comprise a radius of a real sphere, a number of ideal contact points between the probe tip and a virtual sphere or the real sphere, and an allowable range for a radius of the probe tip;
   a simulation module operable to simulate the virtual sphere according to the radius of the real sphere and a random point on the upper hemisphere surface of the real sphere, and calculate coordinates of a center of the virtual sphere;

a calculation module operable to calculate coordinates of the ideal contact points of the virtual sphere according to the coordinates of the center of the virtual sphere and the number of the ideal contact points;

an obtaining module operable to obtain coordinates of first real contact points of the real sphere according to the coordinates of the ideal contact points of the virtual sphere;

the calculation module further operable to calculate coordinates of the center of the real sphere according to the coordinates of the first real contact points, and calculate coordinates of the ideal contact points of the real sphere according to the coordinates of the center of the real sphere;

the obtaining module further operable to obtain coordinates of second real contact points of the real sphere according to the coordinates of the ideal contract points of the real sphere;

the calculation module further operable to calculate the radius of the probe tip according to the coordinates of the second real contact point; and a determination module operable to determine if the calculated radius of the probe tip falls in the allowable range.

2. The computing system of claim 1, wherein probe tip verification system further comprises a displaying module operable to display verification success or verification failure information on a display device.

3. The computing system of claim 1, wherein the number of the ideal contact points falls in a range from 4 to 20.

4. The computing system of claim 1, wherein the center of the real sphere is calculated by the fitting algorithm and the quasi-Newton iterative algorithm.

5. The computing system of claim 1, wherein the radius of the probe tip is calculated by the fitting algorithm and the quasi-Newton iterative algorithm.

6. A computer-implemented method for verifying a probe tip of a coordinate measuring machine, the method comprising:

setting parameters that are used for verifying the probe tip, wherein the parameters comprise a radius of a real sphere, a number of ideal contact points between the probe tip and a virtual sphere or the real sphere, an allowable range for a radius of the probe tip;

simulating the virtual sphere according to the radius of the real sphere and a random point on the upper hemisphere surface of the real sphere, and calculating coordinates of a center of the virtual sphere;

calculating coordinates of the ideal contact points of the virtual sphere according to the coordinates of the center of the virtual sphere and the number of the ideal contact points;

obtaining coordinates of first real contact points of the real sphere according to the coordinates of the ideal contact points of the virtual sphere;

calculating coordinates of the center of the real sphere according to the coordinates of the first real contact points, and calculates coordinates of the ideal contact points of the real sphere according to the coordinates of the center of the real sphere;

obtaining coordinates of second real contact points of the real sphere according to the coordinates of the ideal contract points of the real sphere;

calculating the radius of the probe tip according to the coordinates of the second real contact point; and determining if the calculated radius of the probe tip falls in the allowable range.

7. The method of claim 6, further comprising:

displaying verification success or verification failure information on a display device.

8. The method of claim 6, wherein the number of the ideal contact points falls in a range from 4 to 20.

9. The method of claim 6, wherein the center of the real sphere is calculated by the fitting algorithm and the quasi-Newton iterative algorithm.

10. The method of claim 6, wherein the radius of the probe tip is calculated by the fitting algorithm and the quasi-Newton iterative algorithm.

11. A non-transitory computer-readable medium having stored thereon instructions that, when executed by a computing system, causing the computing system to perform a method for verifying a probe tip of a coordinate measuring machine, the method comprising:

setting parameters that are used for verifying the probe tip, wherein the parameters comprise a radius of a real sphere, a number of ideal contact points between the probe tip and a virtual sphere or the real sphere, and an allowable range for a radius of the probe tip;

simulating the virtual sphere according to the radius of the real sphere and a random point on the upper hemisphere surface of the real sphere, and calculating coordinates of a center of the virtual sphere;

calculating coordinates of the ideal contact points of the virtual sphere according to the coordinates of the center of the virtual sphere and the number of the ideal contact points;

obtaining coordinates of first real contact points of the real sphere according to the coordinates of the ideal contact points of the virtual sphere;

calculating coordinates of the center of the real sphere according to the coordinates of the first real contact points, and calculates coordinates of the ideal contact points of the real sphere according to the coordinates of the center of the real sphere;

obtaining coordinates of second real contact points of the real sphere according to the coordinates of the ideal contract points of the real sphere;

calculating the radius of the probe tip according to the coordinates of the second real contact point; and determining if the calculated radius of the probe tip falls in the allowable range.

12. The medium of claim 11, wherein the method further comprise:

displaying verification success or verification failure information on a display device.

13. The medium of claim 11, wherein the number of the ideal contact points falls in a range from 4 to 20.

14. The medium of claim 11, wherein the center of the real sphere is calculated by the fitting algorithm and the quasi-Newton iterative algorithm.

15. The medium of claim 11, wherein the radius of the probe tip is calculated by the fitting algorithm and the quasi-Newton iterative algorithm.

* * * * *